J. B. VERNON.
ROTARY MOTOR AND PUMP.
APPLICATION FILED JULY 10, 1912.

1,082,183.

Patented Dec. 23, 1913.

2 SHEETS—SHEET 1.

WITNESSES
W. T. Holman
Elbert L. Hyde

INVENTOR
James B. Vernon,
By Fredk W. Winter,
Attorney

J. B. VERNON.
ROTARY MOTOR AND PUMP.
APPLICATION FILED JULY 10, 1912.

1,082,183.

Patented Dec. 23, 1913.
2 SHEETS—SHEET 2.

WITNESSES

INVENTOR

UNITED STATES PATENT OFFICE.

JAMES B. VERNON, OF PITTSBURGH, PENNSYLVANIA, ASSIGNOR TO LEE S. SMITH & SON COMPANY, OF PITTSBURGH, PENNSYLVANIA, A COPARTNERSHIP.

ROTARY MOTOR AND PUMP.

1,082,183.  Specification of Letters Patent.  Patented Dec. 23, 1913.

Application filed July 10, 1912. Serial No. 708,707.

*To all whom it may concern:*

Be it known that I, JAMES B. VERNON, a resident of Pittsburgh, in the county of Allegheny and State of Pennsylvania, have invented a new and useful Improvement in Rotary Motors and Pumps, of which the following is a specification.

This invention relates to a combined motor and pump.

The object of the invention is to produce an arrangement of motor and pump, mounted upon a common base, in which vibration is reduced to a minimum and the heat produced in operation of the pump will not be transmitted to the motor and will not affect the same.

Further objects of the invention are to provide a connection between the motor and the pump which will obviate the necessity of exact alinement therebetween, and to improve generally the construction of the motor.

The invention comprises the construction and arrangement of parts hereinafter described and claimed.

Figure 1:
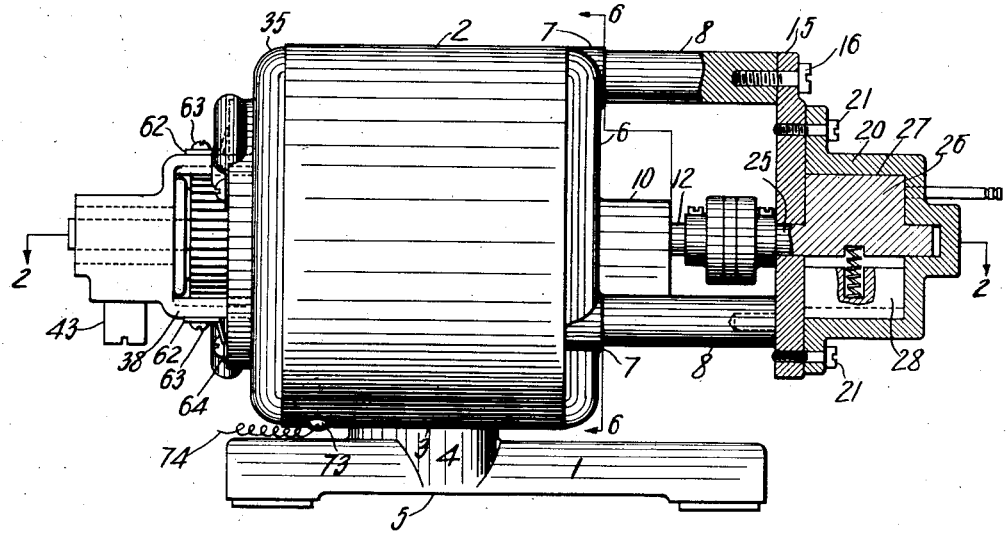
Figure 2:
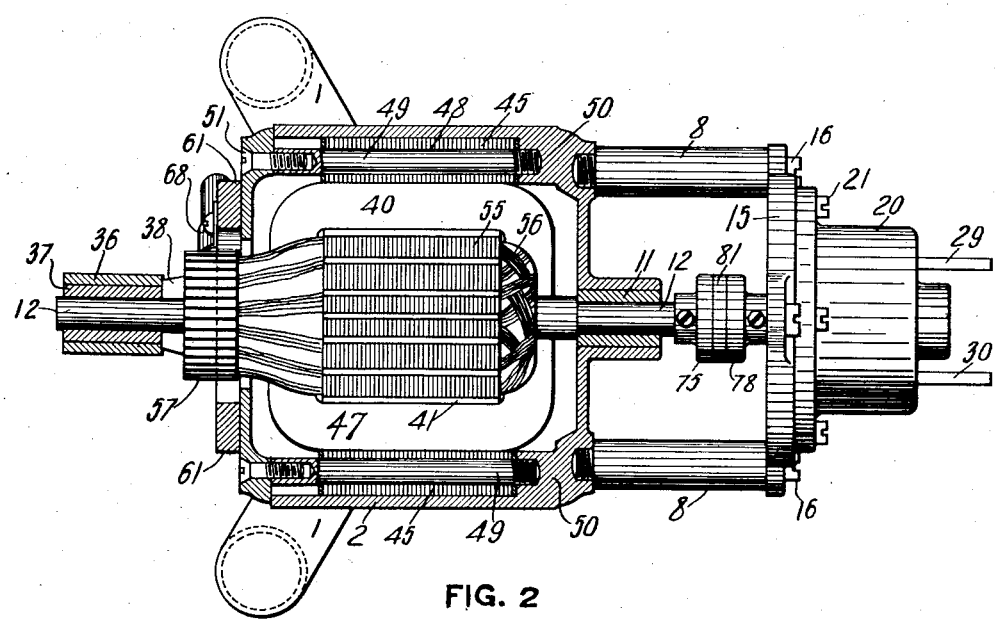
Figure 3:
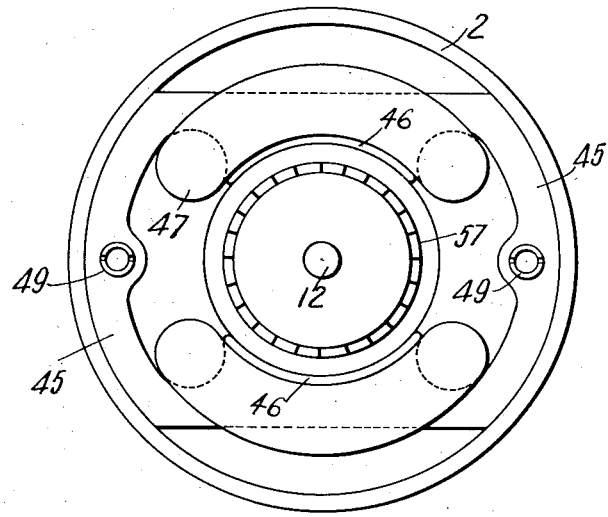
Figure 4:
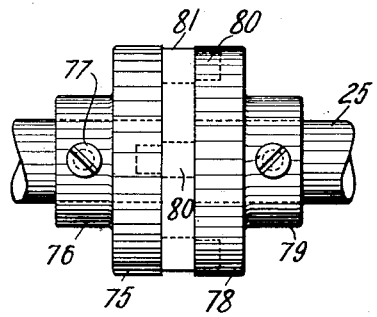
Figure 5:
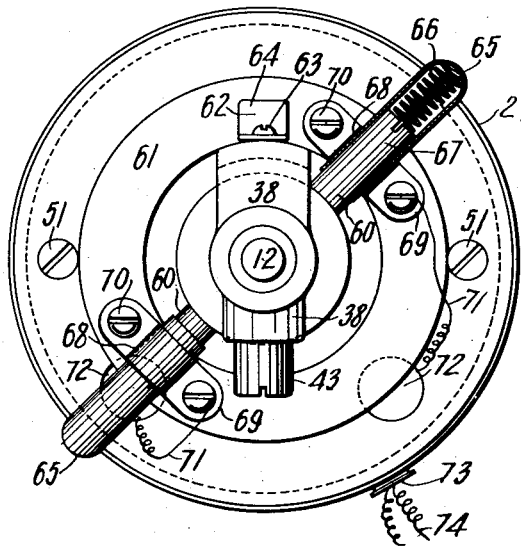
Figure 6:
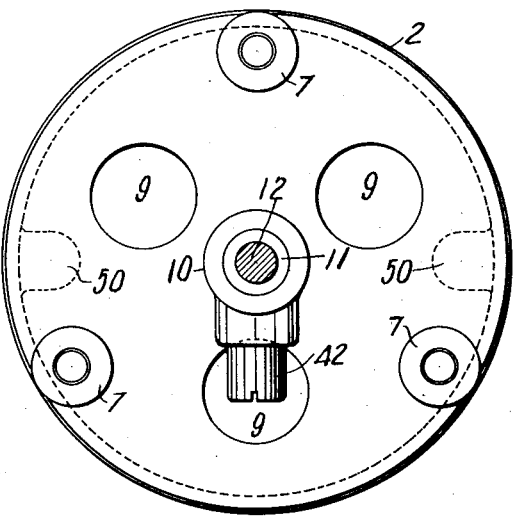

In the drawings Figure 1 is a side elevation, partly in section, of a motor and pump embodying the invention; Fig. 2 is a horizontal section thereof on the line 2—2, Fig. 1; Fig. 3 is an end view of the motor with one end head removed and showing its interior parts; Fig. 4 is an enlarged detail view of the connection between the motor and pump; Fig. 5 is an end view from the left in Fig. 1, the base being omitted; and Fig. 6 is a cross section on the line 6—6, Fig. 1.

The motor and pump illustrated in the drawings are mounted upon and suitably secured to a common base 1, having three or more horizontally spreading legs, so arranged as to steadily and firmly support the motor and pump. In the embodiment shown, the motor is contained within a cylindrical shell or casing 2, the lower portion of which is slightly flattened, as at 3, to fit the upper surface of a boss or projection 4 on the base 1 to which the casing is secured by ordinary screws or bolts 5. At the pump end the shell or casing 2 is formed with an integral or rigid head 6 provided with circumferentially spaced bosses 7, three being shown, which are threaded to receive longitudinally extending rods or bars 8 which support the pump at their other ends. The head 6 of the shell or casing 2 is also provided with a number of circumferentially spaced apertures 9 to permit a free flow of air through the interior of the casing to ventilate and cool the motor and prevent undue heating thereof. Centrally, it is also provided with an outwardly extending boss or projection 10 carrying a suitable bearing 11 for supporting the motor shaft 12.

Secured to the free ends of the rods or bars 8 is a circular plate or head 15, provided with apertures alined with the rods or bars and through which screws or bolts 16 are passed thereinto. The pump casing 20 is suitably secured to the head or plate 15, as by screws or bolts 21. This pump specifically forms no part of my invention and may be of any suitable type. It is preferred, however, to use a pump of the type shown in the patent granted February 20, 1912, to myself and George DeCamp, No. 1,018,221 and which is of the rotary piston type. Briefly described, it embodies a shaft 25 on which is formed, or to which is secured, a piston 26 mounted to rotate in an eccentric chamber 27 and provided with radially movable blades or vanes 28 which sweep around the chamber and force the air through the pump. The pump is provided at one end with suitable inlet and outlet connections, marked "29" and "30" respectively, communicating with the chamber 27.

At its other end the shell or casing 2 is provided with a removable head 35 which is generally of circular form and is secured to the shell in a manner to be described more in detail hereinafter. Integral with the head 35 is a bearing member 36 formed with a central bore to receive a bearing 37 and spaced away from the head 35 by arms 38.

The motor shown in the drawings is of the alternating current induction type and embodies a stator 40 and a rotor 41, the shaft 12 of the rotor 41 being mounted in the bearings 37 and 11. Suitable grease cups 42 and 43 are screwed into the under sides of the bosses 10 and 36 to lubricate the bearings of the motor shaft.

The stator 40 of the motor is of the two-pole type and embodies a laminated field 45 which has an approximately cylindrical outer surface to fit the interior wall of the casing 2 and is provided with the oppositely disposed poles 46 around which are wound the field coils 47, these being contained within the interior of the field. To support the field 45 within the motor casing and to also secure the head 35 thereto, the several laminations of the field are provided with alined bores 48 through which extend rods 49 which are threaded at their ends into internal bosses 50 on the forward head 6 of the motor casing. The outer ends of the rods 49 are threaded to receive screws 51 which pass through the head 35 and into the rods. By screwing the rods 49 through the bores 48 and into the bosses 50 and then securing the head 35 to the rods, the stator 40 is securely held in place within the casing and the head 35 is removably secured thereto.

The rotor 41 is of ordinary type and embodies a revolving laminated field 55 and windings 56 and forms the secondary of the motor. At one end it is provided with the usual commutator 57, the segments of which are connected to the various windings of the rotor.

The present type of motor is so arranged as to have all of its adjustable elements and those parts which may need repair or replacement on the outside of the casing and where they will be easily accessible. The commutator 57 of the motor is embraced by the arms 38 of the head 35 and projects beyond the head 35, as will be apparent from Fig. 1 of the drawings. The brushes 60 are mounted upon an insulating ring 61 which surrounds the arms 38 and lies close to the outer face of the head 35. This ring 61 may be formed of any suitable insulating material, as fiber, hard rubber or the like. Its interior surface snugly fits the outer surface of the arms 38 and it is held in place thereon by small angle members 62 secured to the arms 38, as by screws 63, and provided with upturned ends 64 resting against the outer face of the ring 61. The ring 61 is rotatable on the arms 38 and is intended to be frictionally held in position in such manner as to adjustably support the brushes 60 in order that the lag or slip of the motor may be varied or regulated exactly from the exterior of the casing of the motor.

The brushes 60 are of simple construction and embody metallic tubes 65, formed of copper, brass or the like, closed at their outer ends and in which are mounted spiral compression springs 66 which, at their forward ends bear against and force the carbon contact members 67 into contact with the commutator 57 of the motor. The tubes 66 of the brushes 60 are held in half round grooves 68 in the fiber ring 61 by plates or clamping members 69 which span the tubes and are secured to the ring 61 by contact screws 70.

The leads 71 for the brushes 60 pass from the interior of the shell or casing 2 through apertures 72 in the head 35, and at their ends are secured under the contact screws 70. The openings 72, in addition to permitting the leads 71 to be brought to the exterior of the casing, assist in permitting ventilating of the casing to cool the motor.

In one side and near the base 1, the shell 2 is provided with an aperture 73, through which the leads 74 from the exterior circuit for driving the motor pass to the field coils of the stator 40.

To minimize vibration and avoid the bad effects of misalinement between the shaft 12 of the motor and the shaft 25 of the pump, a loose connection is provided therebetween. The pump end of the shaft 12 is provided with a disk 75 having a boss 76 into which is threaded a screw 77 to engage a flattened portion of the shaft for securing the disk thereon. A similar disk 78, provided with a boss 79, is similarly secured to the pump shaft 25. The disks 75 and 78 are each provided on their meeting faces with longitudinally extending pins 80, circumferentially spaced about the shaft. Any number of such pins may be used on either part. Between the disks 75 and 78 is mounted a washer 81 formed of leather, rubber, fiber or any other slightly yielding material and provided with a number of circumferentially spaced apertures through which the pins 80 on the disks 75 and 78 project. The connection described permits of positive rotation of the shaft 25 from the shaft 12 through the washer 81, and at the same time permits slight longitudinal and lateral play between these members. With the connection described it is unnecessary to secure the motor casing 20 to the shell or casing 2 with the shaft 25 in exact alinement with the shaft 12, thus obviating extremely accurate machining. It is sufficient if these two shafts are brought into approximate alinement, as the connection described will take up any variation therein. The connection at the same time is noiseless and prevents jar on the pump in starting and stopping the motor.

The motor and pump described are, in practice, built of comparatively small size, the pump being intended primarily for medical or dental use and to either deliver a comparatively small supply of compressed air, or it may be used as a suction device of low capacity. Both the motor and the pump are so arranged as to be silent in operation and at the same time are of exceedingly large capacity in proportion to their size. The open space around the connection between the pump and motor prevents overheating of the motor by the pump and permits a free circulation of air through the motor casing. The construction also furnishes a self-contained device in which a separate support for the pump is not required, a common base serving for both the pump and motor. The casing or shell of the motor is simply constructed and comprises but few parts. The insulating ring 61 and brushes 60 are on the outside of the casing and the brushes may be readily and easily adjusted to secure the highest efficiency in operation by regulation of the lag of the motor. The leads for the motor and its lubricating cups are all accessible from the outside of its casing.

What I claim is:

1. A portable combined motor and pump, comprising a base, a motor supported on a horizontal axis upon said base and having a shell or housing, rods detachably secured to and extending horizontally in the direction of the motor axis from one end of said shell or housing, a self-contained pump supported on the ends of said rods and bodily removable therefrom, and a separable connection between the motor shaft and said pump for driving the latter.

2. A portable combined motor and pump, comprising a base, a motor supported thereon upon a horizontal axis and having a shell formed with an integral head at one end and a removable head at the other end, bearings in said heads, a rotor for said motor having a horizontal shaft mounted in said bearings, a stator within said casing, a self-contained pump secured to and carried by said casing and bodily removable therefrom, and driving connections between said shaft and pump.

3. A portable combined motor and pump, comprising a base, a motor supported thereon and provided with a shell or casing having an integral head at one end, a stator within said casing, a removable head at the other end of said casing, rods for securing said stator to said casing and also supporting said removable head, a rotor within said casing and supported by said heads and having a shaft projecting endwise through said fixed head, a pump comprising a casing and a piston therein, said pump casing being spaced from and removably secured to and carried by said fixed head, and connections between said shaft and piston for driving the same.

4. A portable combined motor and pump, comprising a base, a motor supported thereon and having a shell, a fixed head at one end of said shell and a removable head at the other end thereof, said heads being provided with apertures for circulating air through the casing, a stator within said shell of cylindrical form to fit the same, rods for securing said stator and said removable head to said casing, a rotor, bearings in said heads for supporting the same, and a pump removably attached to and spaced from the fixed head of said casing and operatively connected to said rotor.

In testimony whereof I have hereunto set my hand.

JAMES B. VERNON.

Witnesses:
H. W. NESTLE,
J. H. KLINE.